US008190323B2

(12) United States Patent
Maeda et al.

(10) Patent No.: US 8,190,323 B2
(45) Date of Patent: May 29, 2012

(54) VEHICLE INFORMATION RECORDING SYSTEM

(75) Inventors: Fumio Maeda, Yotsukaichi (JP); Daigo Akutsu, Kariya (JP); Kimihiko Sugino, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 503 days.

(21) Appl. No.: 12/439,735

(22) PCT Filed: Mar. 21, 2008

(86) PCT No.: PCT/JP2008/055290

§ 371 (c)(1), (2), (4) Date: Mar. 3, 2009

(87) PCT Pub. No.: WO2008/123145

PCT Pub. Date: Oct. 16, 2008

(65) Prior Publication Data

US 2010/0023207 A1 Jan. 28, 2010

(30) Foreign Application Priority Data

Apr. 2, 2007 (JP) ................................ 2007-096922

(51) Int. Cl.
*G01M 17/00* (2006.01)

(52) U.S. Cl. ...................... 701/33.4; 701/33.6; 701/33.9

(58) Field of Classification Search .................... 701/35, 701/33.4, 33.6, 33.9
See application file for complete search history.

(56) References Cited

U.S. PATENT DOCUMENTS

| | | | | |
|---|---|---|---|---|
| 5,446,659 | A * | 8/1995 | Yamawaki | 701/29 |
| 5,638,273 | A * | 6/1997 | Coiner et al. | 701/35 |
| 5,948,026 | A * | 9/1999 | Beemer et al. | 701/35 |
| 6,067,488 | A * | 5/2000 | Tano | 701/35 |
| 6,298,290 | B1 * | 10/2001 | Abe et al. | 701/35 |
| 6,438,472 | B1 | 8/2002 | Tano et al. | |
| 6,636,791 | B2 * | 10/2003 | Okada | 701/35 |
| 6,676,841 | B2 * | 1/2004 | Akins et al. | 210/744 |
| 6,748,305 | B1 * | 6/2004 | Klausner et al. | 701/35 |
| 7,899,595 | B2 * | 3/2011 | Shimizu | 701/45 |
| 2005/0131597 | A1 | 6/2005 | Raz et al. | |

FOREIGN PATENT DOCUMENTS

| | | |
|---|---|---|
| EP | 1 548 653 A2 | 6/2005 |
| EP | 1 548 653 A3 | 6/2005 |
| JP | 10 24784 | 1/1998 |
| JP | 11 125584 | 5/1999 |
| JP | 2000 171267 | 6/2000 |
| JP | 2003 182650 | 7/2003 |
| JP | 2004 318912 | 11/2004 |
| JP | 2006 349028 | 12/2006 |
| JP | 2007 11907 | 1/2007 |
| RU | 2004 112 211 A | 10/2005 |
| WO | 01 98123 | 12/2001 |
| WO | WO 2007/004513 A1 | 1/2007 |

* cited by examiner

*Primary Examiner* — Darnell Jayne
*Assistant Examiner* — Stanton L Krycinski
(74) *Attorney, Agent, or Firm* — Oblon, Spivak, McClelland, Maier & Neustadt, L.L.P.

(57) ABSTRACT

A vehicle information recording system has an ECU and the like to detect an abnormal event that occurs on the vehicle, a vehicle state determination unit to determine a vehicle state including at least one of a running state and a running environment of the vehicle based on an output value and a threshold of a sensor and a switch provided in various parts of the vehicle, and a memory unit to record a vehicle state when an abnormal event is detected, which is determined by the vehicle state determination unit, and a duration time of the vehicle state determined by the vehicle state determination unit from when the output value exceeds the threshold to when the abnormal event is detected.

16 Claims, 15 Drawing Sheets

FIG.2

| VEHICLE STATE | NORMAL STATE | SPECIFIC STATE A | SPECIFIC STATE B | DETERMINATION SOURCE SIGNAL |
|---|---|---|---|---|
| CURVE | NORMAL STATE | WINDING | LONG CURVE | STEERING SENSOR, YAW RATE SENSOR |
| ROAD SURFACE | NORMAL STATE | ROUGH SURFACE ROAD | — | VERTICAL GRAVITY SENSOR, HEIGHT SENSOR |
| SLOPE | NORMAL STATE | SLOPED | — | SLOPE SENSOR, HEIGHT SENSOR |
| ACCELERATION | NORMAL STATE | RAPID ACCELERATION | RAPID DECELERATION | ACCELERATION SENSOR, ENG REVOLUTION |
| SPEED | NORMAL STATE | CONTINUOUS HIGH SPEED | CONTINUOUS LOW SPEED | VEHICLE SPEED, ENG REVOLUTION |
| CURRENT | NORMAL STATE | LARGE CURRENT SUPPLY | — | CURRENT SENSOR |
| BAT VOLTAGE | NORMAL STATE | LOW VOLTAGE | — | VOLTAGE SENSOR |
| VEHICLE POWER SOURCE | IG | BAT | ACC | IG SWITCH |
| WEATHER | OTHER THAN RAIN | RAIN | — | WIPER |
| TEMPERATURE | NORMAL STATE | HIGH TEMPERATURE | LOW TEMPERATURE | EXTERNAL TEMPERATURE SENSOR |

FIG.10

| | DATA AMOUNT REQUIRED TO RECORD DATA OF INSTANT (ONCE) | DATA AMOUNT REQUIRED TO RECORD PRIMARY CHANGE (THREE TIMES) | DATA AMOUNT REQUIRED TO RECORD SECONDARY CHANGE (FIVE TIMES) |
|---|---|---|---|
| VEHICLE SPEED | $D_1$ bit | $D_{44}$ bit | $D_{77}$ bit |
| ENGINE REVOLUTION | $D_{33}$ bit | $D_{66}$ bit | $D_{99}$ bit |
| STEERING ANGLE | $D_{22}$ bit | $D_{55}$ bit | $D_{88}$ bit |
| AMBIENT TEMPERATURE | $D_1$ bit | $D_{44}$ bit | $D_{77}$ bit |
| TOTAL | $D_{xx}$ bit | $D_{yyy}$ bit | $D_{zzz}$ bit |

FIG.15
(a)
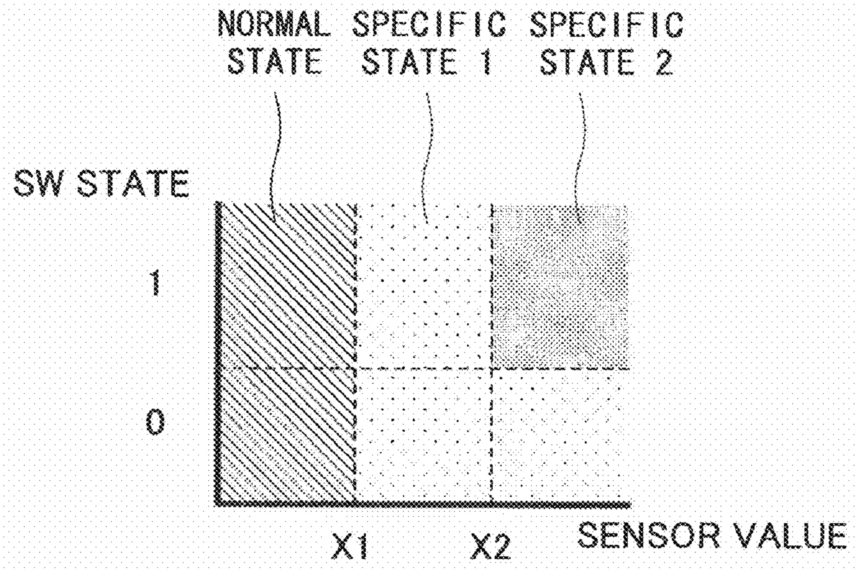
(b)
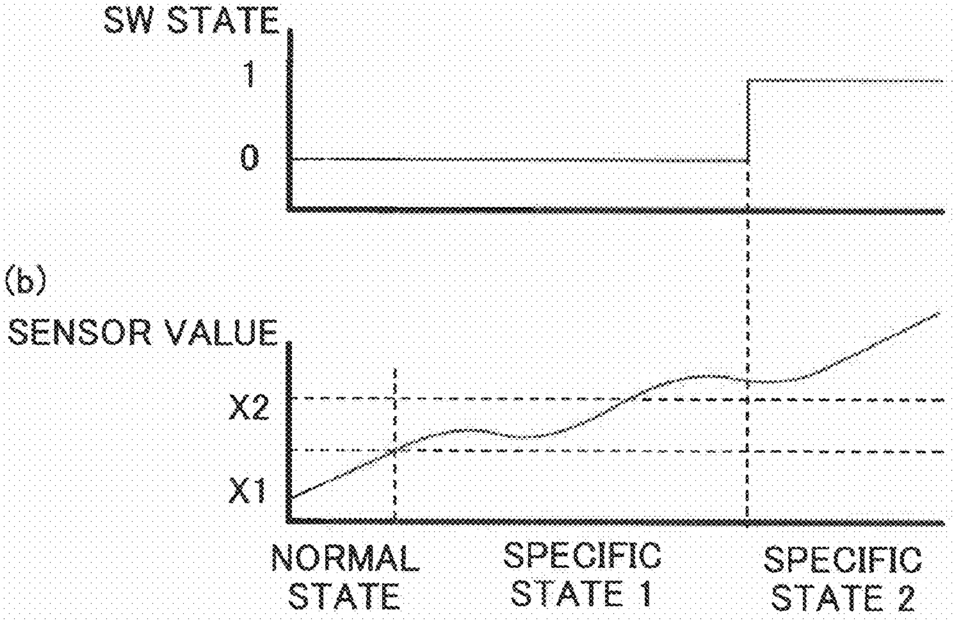

EXAMPLE OF MEMORY AREA

| | |
|---|---|
| STATE 1 BEFORE DIAGNOSTIC TROUBLE CODE (DTC) IS GENERATED | DURATION TIME 1 |
| STATE 2 BEFORE DTC IS GENERATED | DURATION TIME 2 |

FIG.19

| PERIOD | | 1 | 2 | 3 | 4 | 5 | 6 | 7 | 8 | 9 | 10 |
|---|---|---|---|---|---|---|---|---|---|---|---|
| VEHICLE STATE | STATE | NORMAL | NORMAL | STATE A | STATE A | NORMAL | NORMAL | NORMAL | STATE A | NORMAL | NORMAL |
| | TRIP | 1 | | | | | 2 | | | 3 | |
| | ABNORMALITY | | | | | | | | | | X |
| | | | | | | | | | | | |
| RECORDED INFORMATION | OVER THRESHOLD OUTPUT VALUE | × | × | ○ | ○ | × | × | × | ○ | × | × |
| | OVER THRESHOLD CONTINUOUS DURATION TIME | – | – | 1 | 2 | 0 | 0 | 0 | 1 | 0 | 0 |
| | CUMULATIVE OVER THRESHOLD DURATION TIME | – | – | 1 | 2 | 2 | 2 | 2 | 3 | 3 | 3 |
| | NUMBER OF OVER THRESHOLD TRIPS | 0 | 0 | 1 | 1 | 1 | 1 | 1 | 2 | 2 | 2 |
| | NUMBER OF OVER THRESHOLD OUTPUT VALUES | 0 | 0 | 2 | 3 | 0 | 0 | 0 | 2 | 0 | 0 |

VEHICLE INFORMATION RECORDING SYSTEM

TECHNICAL FIELD

The present invention relates to a vehicle information recording system, which records information about a vehicle.

BACKGROUND ART

Conventionally, there is known a technique to monitor information about driving states obtained by using an internal sensor, and to record the information about the monitored driving states in a longer time span before and after the time when an abnormal event or an event close to an abnormal event has occurred in factors (a steering wheel, a brake, an accelerator, an engine itself, and the like) related to the driving (see Patent Document 1). By this conventional technique, information before and after the time when an event diagnosed to be abnormal has occurred are recorded as vehicle behavior log data. This is because a memory device is required to have vast memory capacity to record all information about driving, which is detected by various sensors, as vehicle movement log data. In this conventional technique, maintenance information of a vehicle is outputted, which information is obtained by analyzing the recorded vehicle movement log data.

Patent Document 1: JP-A-10-24784

DISCLOSURE OF INVENTION

Problems to be Solved by the Invention

In the above-described related art, however, data are required to be time-sequentially recorded plural times to know the characteristics and a change tendency of the data obtained by the sensors, which is likely to increase the amount of data to be recorded. According to the aforementioned related art, the required memory capacity is reduced by recording log data before and after an abnormal event has occurred compared to the case of recording all log data. However, since discrete data (values) obtained by the sensors are recorded as they are, it is impossible to know the situation of the vehicle unless the recorded discrete values are processed and analyzed. Thus, it becomes difficult to estimate the cause of the abnormal event.

In view of this, it is an object of at least one embodiment of the present invention to provide a vehicle information recording system which requires less memory capacity and makes it easy to estimate a cause of an abnormal event.

Means for Solving the Problems

In order to attain the above object, a vehicle information recording system includes an abnormality detecting unit to detect an abnormal event generated on a vehicle, a vehicle state determination unit to determine a vehicle state including at least one of a running state and a running environment of the vehicle based on an output value and a threshold of a sensor provided to operate in various parts of the vehicle, and a memory unit to record a vehicle state when the abnormal event is detected, which is determined by the vehicle state determination unit, and duration time of the vehicle state determined by the vehicle state determination unit from when the output value exceeds the threshold to when the abnormal event is detected.

It is preferable that a vehicle state before the output value exceed the threshold, which is determined by the vehicle state determination unit, and duration time of the vehicle state be also recorded.

It is preferable that a duration time of the vehicle state during which the output value exceed the threshold be recorded.

It is preferable that a cumulative duration time of the vehicle state during which the output value exceed the threshold be recorded.

It is preferable that the number of times that the output value exceed the threshold be recorded.

It is preferable that the number of trips in which the output value exceed the threshold be recorded.

It is preferable that the threshold be set in accordance with the number of the vehicle states determined by the vehicle information recording system.

It is preferable that the threshold be set in accordance with an environment where the vehicle be used.

It is preferable that the vehicle state determined by the vehicle information recording system be at least one of a state in which the output value of the sensor exceeds the threshold a predetermined number of times, a state in which the output value of the sensor exceeds the threshold for a predetermined period, a state in which the output value of the sensor becomes higher than the threshold, and a state in which the output value of the sensor becomes lower than the threshold.

A vehicle information recording system includes an abnormality detecting unit to detect an abnormal event generated on a vehicle, a vehicle state determination unit to determine a vehicle state including at least one of a running state and a running environment of the vehicle based on an output value and a threshold of a sensor provided to operate in various parts of the vehicle, and a memory unit to record a vehicle state when the abnormal event is detected, which is determined by the vehicle state determination unit, and duration time of the vehicle state determined by the vehicle state determination unit from when the output value exceeds the threshold to when the abnormal event is detected. A time unit of the duration time is set in accordance with a change rate of the vehicle state which is determined by the vehicle state determination unit.

A vehicle information recording system includes an abnormality detecting unit to detect an abnormal event generated on a vehicle, a vehicle state determination unit to determine a vehicle state including at least one of a running state and a running environment of the vehicle based on an output value and a threshold of a sensor provided to operate in various parts of the vehicle, and a memory unit to record a vehicle state when the abnormal event is detected, which is determined by the vehicle state determination unit, and duration time of the vehicle state determined by the vehicle state determination unit from when the output value exceeds the threshold to when the abnormal event is detected. The vehicle state when the abnormal event is detected and duration time thereof are recorded in the memory unit based on generation of a diagnostic trouble code corresponding to the abnormal event.

It is preferable that the abnormality detecting unit detect a shock against the vehicle.

Advantage of the Invention

According to the present invention, required memory capacity can be reduced and a cause of an abnormal event can be easily estimated.

BRIEF DESCRIPTION OF THE DRAWINGS

FIG. 2 is a chart showing examples of types and details of vehicle states determined by a vehicle state determination unit 12, and information sources to obtain determined results;

FIG. 10 is a chart showing examples of memory capacities required to record the live data and the like;

FIGS. 15*a* and 15*b* are diagrams for describing methods to determine a vehicle state based on two output values of a sensor and a switch;

FIG. 19 is a chart showing examples of information recorded in the memory unit 14.

EXPLANATION FOR REFERENCE NUMBER

10 main ECU
12 vehicle state determination unit
14 memory unit
16 time measuring unit
20 to 23 ECU
30 to 32 switch
40 to 42 sensor

BEST MODE FOR CARRYING OUT THE INVENTION

Figure 1:
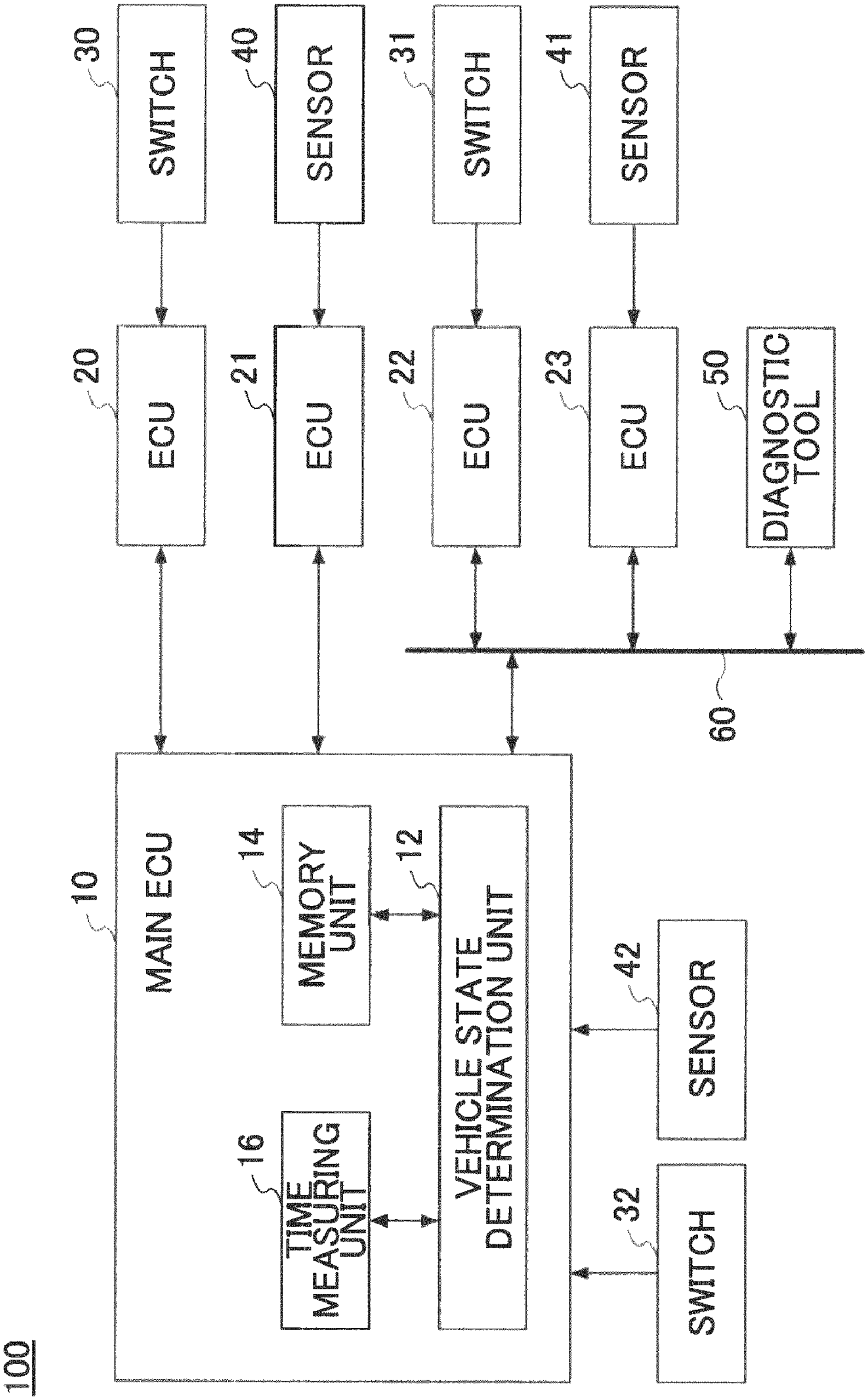
FIG. 1 is a configuration diagram showing a vehicle information recording system 100 as one embodiment of the invention.

Next, the best mode for carrying out the present invention is described with reference to the drawings. FIG. 1 is a configuration diagram of a vehicle information recording system 100 as one embodiment of the invention. The vehicle information recording system 100 records a vehicle state and the like determined based on an output value of a sensor (including a switch and an ECU (Electronic Control Unit)) mounted in the vehicle. By recording a vehicle state or the like in a predetermined period or at a predetermined timing (for example, when an abnormal event such as a fault occurs), the recorded vehicle state and the like can be effectively used when analyzing operations and faults of the vehicle at a later time. Based on such recorded information, the cause of an abnormal event can be investigated in detail after the abnormal event. The recorded vehicle state and the like are read by a recorded information reading device such as a diagnostic tool 50 and a computer. The read recorded information such as a vehicle state can be provided to a user through the recorded information reading device including an information provider such as a display unit and an audio unit or an information providing device which can be connected to the recorded information reading device.

The vehicle information recording system 100 includes a main ECU 10, ECUs 20 to 23, switches 30 to 32, and sensors 40 to 42. The main ECU 10 is connected to the ECU 20 which can obtain a live state (for example, on/off state) of the switch 30 and to the ECU 21 which can obtain live data of the sensor 40. Further, the main ECU 10 is connected to the ECU 22 which can obtain an actual state of the switch 31 and to the ECU 23 which can obtain live data of the sensor 41 through a communication path (for example, a serial communication path or a parallel communication path such as a CAN bus) 60. The main ECU 10 is connected to the switch 32 and the sensor 42. As a result, the main ECU 10 can directly or indirectly obtain states of the switches 30 to 32 and live data of the sensors 40 to 42. Moreover, the main ECU 10 can obtain the states of the switches 30 and 31 and a predetermined process result based on the live data of the sensors 40 and 41 from the ECUs 20 to 23.

The main ECU 10 includes the vehicle state determination unit 12, the memory unit 14, and a time measuring unit 16. In the main ECU 10, a vehicle state is determined by the vehicle state determination unit 12 based on the information obtained by the sensor 40 and the like, and the main ECU 10 records in the memory unit 14 a vehicle state when an abnormal event occurred on the vehicle is detected and duration time of the vehicle state measured by the time measuring unit 16. Then, the main ECU 10 provides the recorded information through the communication path 60 to the diagnostic tool 50.

The vehicle state determination unit 12 determines a vehicle state (for example, a running state or a driving environment of a vehicle) based on the aforementioned information (output values of the sensors) obtained by the sensor 40 and the like. FIG. 2 is a chart showing examples of types and details of vehicle states determined by the vehicle state determination unit 12, and information sources to obtain the determined results. The vehicle state determination unit 12 determines a vehicle state based on a relationship between an output value of the sensor and a predetermined state determination condition to determine a vehicle state. Further, to determine a vehicle state, the vehicle state determination unit 12 may divide the vehicle state into plural detailed states based on plural state determination conditions. The number of the state determination conditions is to be set in accordance with the number of determinations (number of the detailed states) of the vehicle states. Accordingly, the vehicle state can be divided into plural detailed states in accordance with the output value of the sensor, and thereby the past vehicle state can be more precisely reproduced when analyzing the fault.

For example, the vehicle state determination unit 12 determines a vehicle state by dividing the vehicle state into three detailed states of a normal state, a specific state A, and a specific state B, as shown in FIG. 2. FIG. 2 shows a curve state, a road surface state, a slope state, an acceleration state, a speed state, a current state, a battery (BAT) voltage state, a vehicle power source state, a weather state, and a temperature state as examples of the vehicle states.

For example, the vehicle state determination unit 12 determines a running state (curve state) of a vehicle which runs a curved road, based on live data related to a steering angle obtained by the steering sensor and live data related to a yaw rate obtained by a yaw rate sensor. The curve state is divided into, for example, three detailed running states (a running state of a non-curved road (normal road state), a running state of a winding road, and a running state of a long curved road), based on a relationship between the live data obtained by the steering sensor and the yaw rate sensor and a predetermined state determination condition for determining the running state.

Further, the vehicle state determination unit 12 determines, for example, the power source state of the vehicle as a running state of the vehicle based on an actual state of an ignition switch (IG switch). The power source state of the vehicle is determined by dividing the power source state into, for example, an IG state, a BAT state, and an ACC state depending on a position of the IG switch.

Furthermore, the vehicle state determination unit 12 determines a running environment state related to a vehicle ambient temperature, based on live data related to an ambient temperature obtained by an ambient temperature sensor. A running environment state related to the vehicle ambient temperature is determined by dividing the running environment state into, for example, three detailed running environment states (a normal temperature state, a high temperature state, and a low temperature state) based on a relationship between live data obtained by the ambient temperature sensor and a predetermined state determination condition for determining the running environment.

Figure 3:
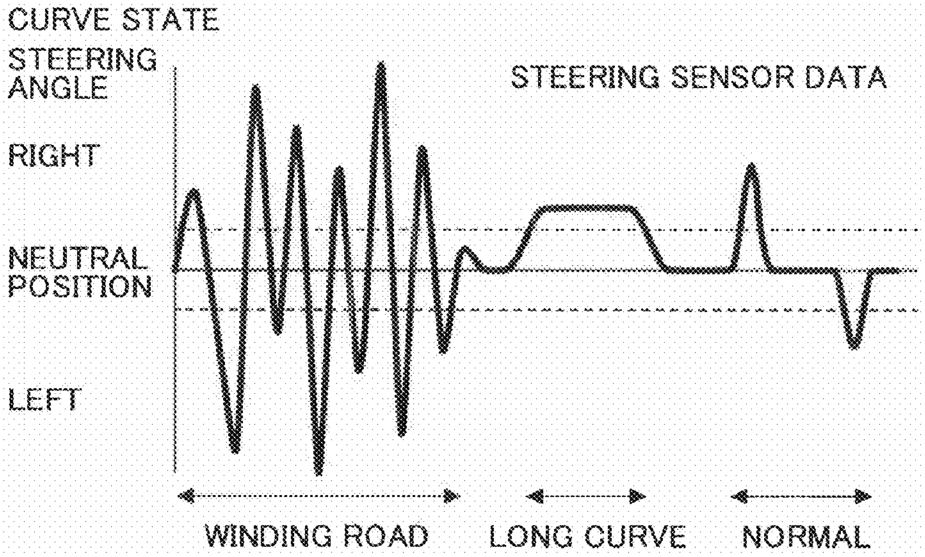
FIG. 3 is a graph showing a relationship between live data obtained by a steering sensor and a decision threshold for determining a curve state based on the live data.

FIG. 3 is a graph showing a relationship between the live data obtained by the steering sensor and decision thresholds for determining a curve state based on the live data. The vehicle state determination unit 12 may determine that the present curve state is the winding road running state when the live data obtained by the steering sensor exceed a threshold of Al (for example, when the live data exceed the predetermined value a predetermined number of times in a predetermined period) as shown in FIG. 3. Further, the vehicle state determination unit 12 may determine that the present curve state is the long curve running state when the live data obtained by the steering sensor exceed a predetermined threshold of A2 (for example, when the live data are kept at the predetermined value or higher for more than a predetermined period) as shown in FIG. 3. By recording the curve state determined by the vehicle state determination unit 12 in the memory unit 14, a defect caused by horizontal gravity or frequent operations of the steering can be easily analyzed.

Figure 4:
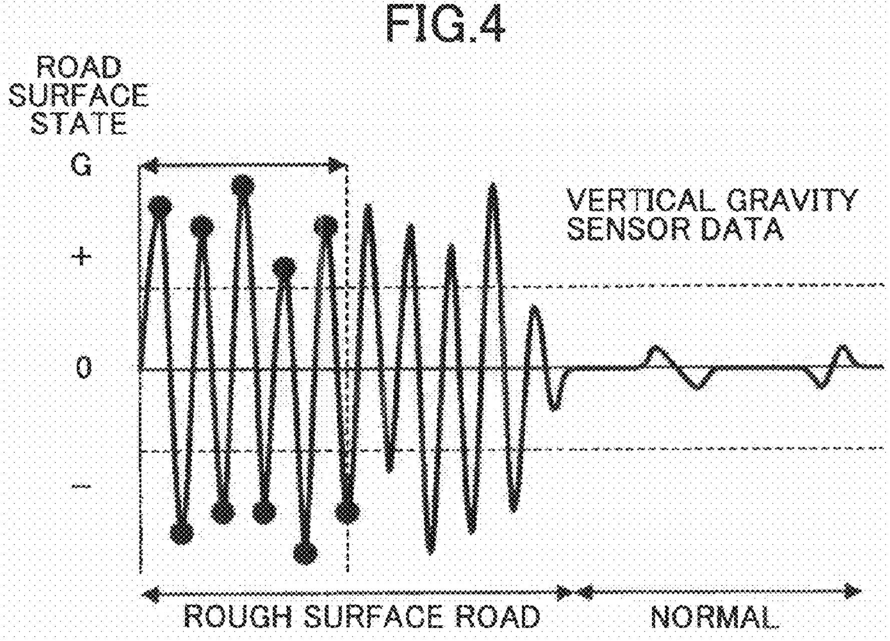
FIG. 4 is a graph showing a relationship between live data obtained by a vertical G sensor and a decision threshold for determining a road surface state based on the live data.

FIG. 4 is a graph showing a relationship between live data obtained by a vertical gravity sensor and a decision threshold for determining a road surface state based on the live data. The vehicle state determination unit 12 may determine that the present road surface state is a rough road surface state when live data related to acceleration of a vehicle in a vertical direction obtained by the vertical gravity sensor exceed a predetermined threshold of A3 (for example, when the live data exceed the predetermined value a predetermined number of times in a predetermined period). By recording the road surface state determined by the vehicle state determination unit 12 in the memory unit 14, a defect caused by vibration can be easily analyzed.

Figure 5:
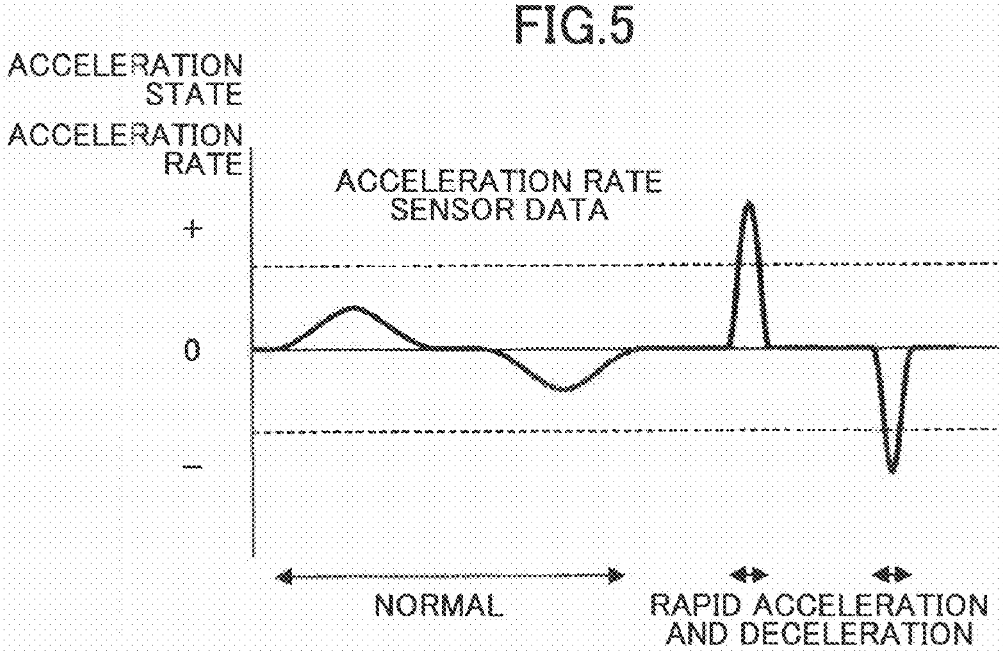
FIG. 5 is a graph showing a relationship between live data obtained by an acceleration sensor and a decision threshold for determining an acceleration state based on the live data.

FIG. 5 is a graph showing a relationship between live data obtained by the acceleration sensor and a decision threshold for determining an acceleration state based on the live data. The vehicle state determination unit 12 may determine that the present acceleration state is a rapid acceleration state (or a rapid deceleration state) when live data related to an acceleration rate of a vehicle in a horizontal direction obtained by the acceleration sensor exceed a predetermined threshold of A4 (for example, when the live data exceed the predetermined value). By recording the acceleration state determined by the vehicle state determination unit 12 in the memory unit 14, a defect caused by acceleration and deceleration can be easily analyzed.

Figure 6:
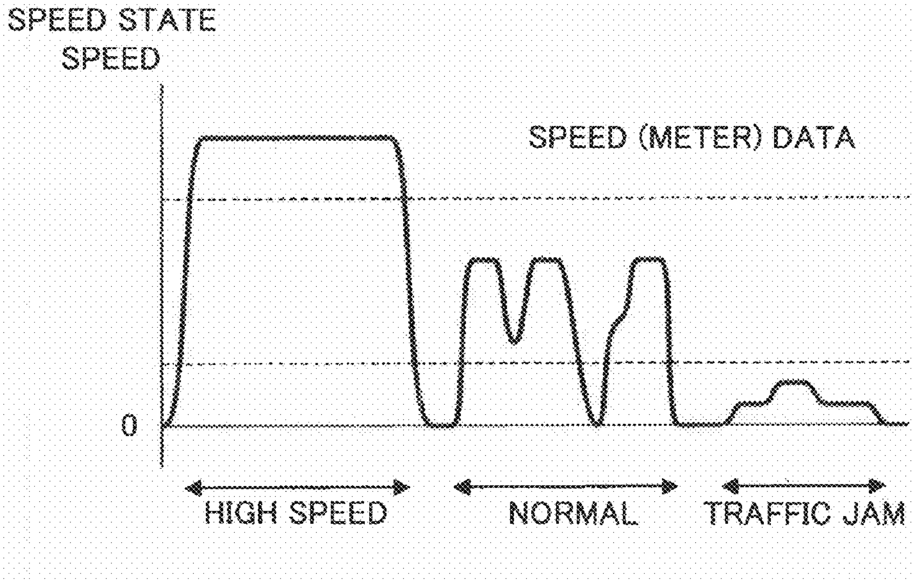
FIG. 6 is a graph showing a relationship between live data obtained by a wheel speed sensor, a meter, or the like and a decision threshold for determining a speed state based on the live data.

FIG. 6 is a graph showing a relationship between live data obtained by the wheel speed sensor, the meter, or the like and a decision threshold for determining a speed state based on the live data. The vehicle state determination unit 12 may determine that the present speed state is a high speed running state when live data related to the vehicle speed obtained by the wheel speed sensor, the meter, or the like exceed a predetermined threshold of A5 (for example, when the live data are kept at the predetermined value or higher for more than a predetermined period), as shown in FIG. 6. Further, the vehicle state determination unit 12 may determine that the present speed state is a low speed (traffic jam) running state when the live data related to the vehicle speed obtained by the wheel speed sensor, the meter, or the like exceed a predetermined threshold value of A6 (for example, when the live data are kept at a predetermined value or lower for more than a predetermined period) as shown in FIG. 6. By recording the speed state determined by the vehicle state determination unit 12 in the memory unit 14, a defect caused by the vehicle speed can be easily analyzed.

Figure 7:
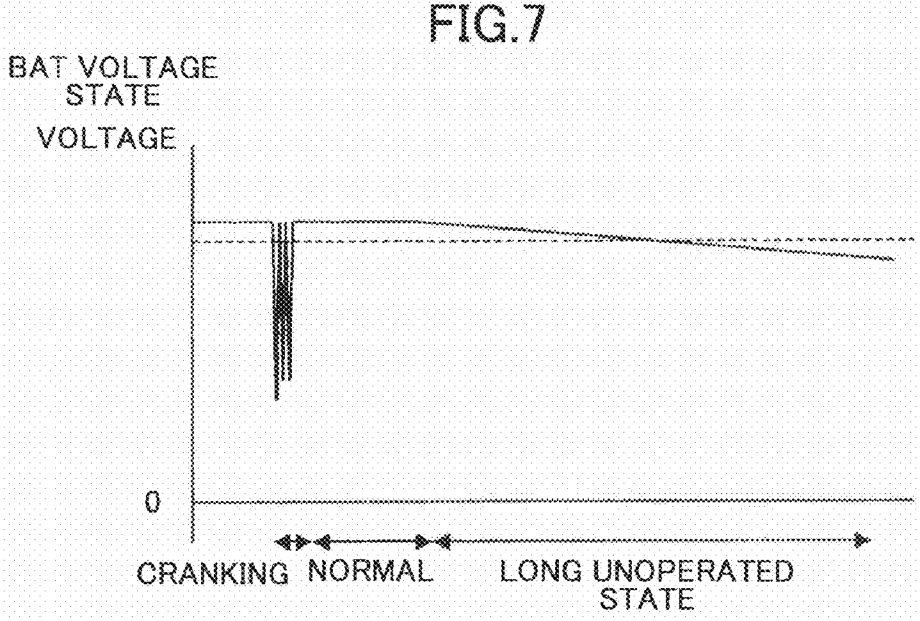
FIG. 7 is a graph showing a relationship between live data obtained by a voltage sensor for a battery voltage (BAT) and a decision threshold for determining a battery voltage state based on the live data.

FIG. 7 is a graph showing a relationship between live data obtained by the voltage sensor of the battery voltage (BAT) and a decision threshold for determining a battery voltage state based on the live data. The vehicle state determination unit 12 may determine that the present battery voltage state is a low voltage state (a long-term unoperated state) when the live data obtained by the voltage sensor of the battery voltage exceed a predetermined threshold of A7 (for example, when the live data become lower than the predetermined value) as shown in FIG. 7. For example, the battery voltage state is not required to be determined for a predetermined period after a starter is started. Accordingly, it can be prevented to detect in error a voltage drop caused by the cranking of the starter. By recording the battery voltage state determined by the vehicle state determination unit 12 in the memory unit 14, a defect caused by the battery voltage can be easily analyzed.

Figure 8:
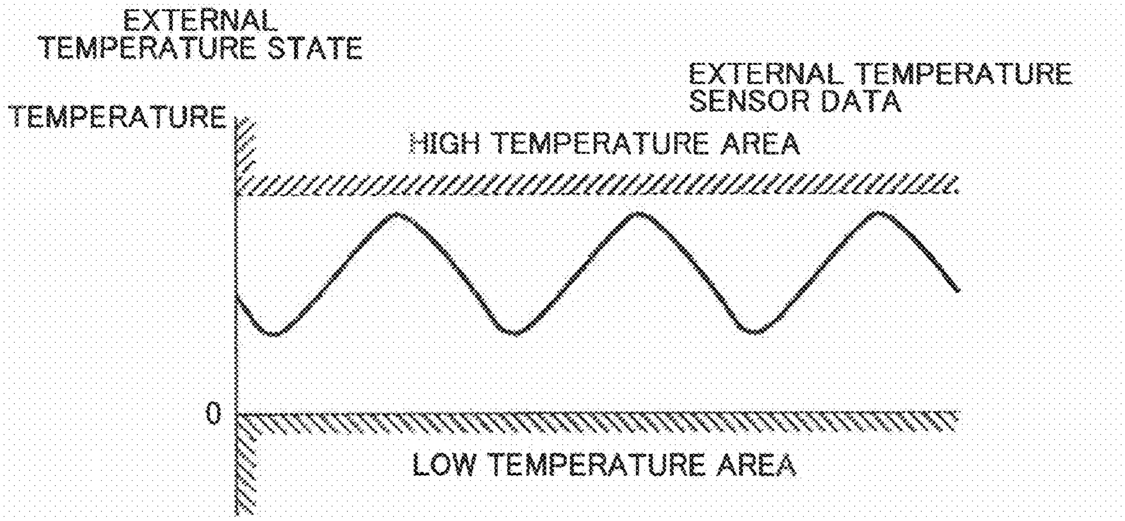
FIG. 8 is a graph showing a relationship between live data obtained by an ambient temperature sensor and a decision threshold for determining an ambient temperature state based on the live data.

FIG. 8 is a graph showing a relationship between live data obtained by the ambient temperature sensor and a decision threshold for determining an ambient temperature state based on the live data. The vehicle state determination unit 12 may determine that the present ambient temperature state is a high temperature state when the live data obtained by the ambient temperature sensor exceed a predetermined threshold of A8 (for example, when the live data exceed a predetermined value) and may determine that the present ambient temperature data are a low temperature state when the live data exceed a predetermined threshold of A9 (for example, when the live data become lower than the predetermined value) as shown in FIG. 8. By recording the ambient temperature state determined by the vehicle state determination unit 12 in the memory unit 14, a defect caused by the ambient temperature can be easily analyzed.

The decision threshold by which the vehicle state determination unit 12 determines a vehicle state may be set corresponding to an environment where the vehicle is constantly used. The "normal state" is different depending on an environment where the vehicle is constantly used. Therefore, by setting a decision threshold depending on the environment in which to use the vehicle, a vehicle state corresponding to the environment can be appropriately determined. The environment where the vehicle is constantly used can be objectively determined by date and time information, position information, and delivery information (information about a country or an area where the vehicle is used). Further, the environment where the vehicle is constantly used can be objectively determined by an average value of the live data obtained by the ambient temperature sensor when the vehicle is used. The data and time information and the position information can be obtained by, for example, a GPS device. The delivery information can be obtained by, for example, an engine ECU. Moreover, the present season can also be determined by the data and time information, and the country and an area where the vehicle is presently used can also be determined by the position information and the delivery information.

Figure 9:
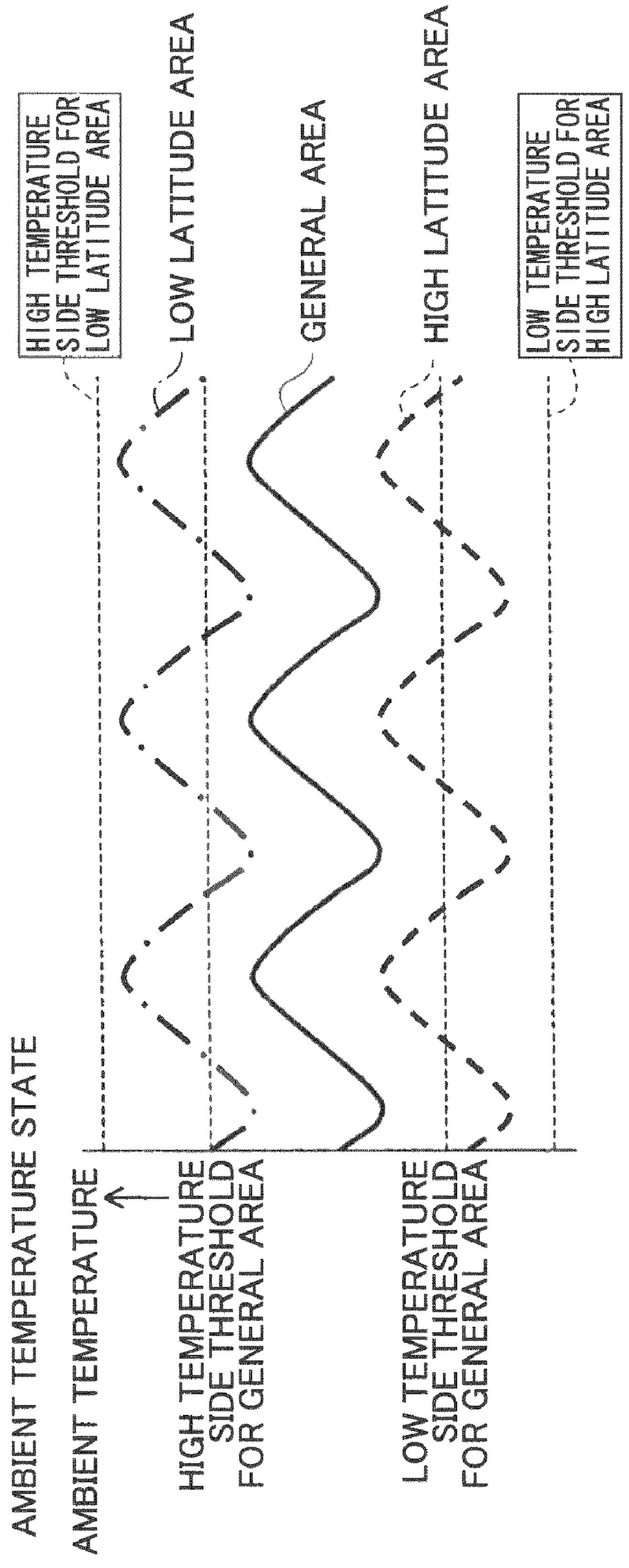
FIG. 9 is a graph showing decision thresholds for determining the ambient temperature state set differently depending on an area where the vehicle is used.

FIG. 9 is a graph showing that decision thresholds for determining the ambient temperature state are set differently depending on the area where the vehicle is used. When a high temperature side decision threshold for a general area is used in a low latitude area, a "high temperature state" is constantly determined even in a normal ambient temperature state which is a "normal state" in the low latitude area. Further, when a low temperature side decision threshold for a general area is used in a high latitude area, a "low temperature state" is constantly determined even in a normal ambient temperature state which is a "normal state" in the high latitude area. Therefore, in the low latitude area, an appropriate ambient temperature state can be determined by setting a high temperature side threshold for the low latitude area to be higher than a high temperature side threshold for a general area. In the high latitude area, an appropriate ambient temperature state can be determined by setting a low temperature side threshold for the high latitude area to be lower than a low temperature side threshold for a general area.

As described above, the vehicle state determined by the vehicle state determination unit 12 is recorded in the memory unit 14 (see FIG. 1). The memory unit 14 is a nonvolatile memory medium such as a hard disk, a flash memory, and an EEPROM. By recording the aforementioned "vehicle state" in the memory unit 14 instead of recording output values such as live data and the like of the sensor as they are, the recorded information can be highly reusable to easily estimate a cause of the abnormal event. For example, when analyzing operations and a fault of a vehicle by reproducing the past vehicle state based on the recorded information, it is easier to know the past state of the vehicle by reading out the vehicle states recorded as they are, than the case of recording discrete output values such as live data and the like.

Moreover, by recording the "vehicle state" in the memory unit 14, less memory capacity is required in the memory unit 14 compared to the case of recording the output values such as the live data and the like of the sensors as they are. FIG. 10 is a chart showing examples of memory capacity required to record the output values such as live data. As shown in FIG. 10, a $D_1$ bit memory capacity is required to record the vehicle speed data, a $D_{33}$ bit memory capacity is required to record the engine revolution data, a $D_{22}$ bit memory capacity is required to record the steering angle data, a $D_1$ bit memory capacity is required to record the ambient temperature data, and the like when recording the live data even only once. Thus, a memory capacity as large as one to two-digit bits is required. When a "vehicle state" determined by the vehicle state determination unit 12 is recorded, on the other hand, one bit memory capacity is enough to record two vehicle states. Further, two-bit memory capacity (for four states) is enough even when the vehicle state indicating the acceleration state is divided into the normal state, the rapid acceleration state, and the rapid deceleration state. In this manner, quite less memory capacity is required to record the information to know the past vehicle state compared to the case of recording output values such as live data of the sensors and the like as they are.

The vehicle state determined by the vehicle state determination unit 12 is recorded and held in the memory unit 14 at a predetermined timing. The vehicle state is recorded in the memory unit 14 at a timing when an abnormal event of the vehicle is detected. Alternatively, the vehicle state may be recorded in the memory unit 14 when a predetermined period has passed after the abnormal event is detected. Abnormality detection also includes "detection of a shock against the vehicle", in which case the vehicle state may be recorded in the memory unit 14 when the shock against the vehicle is detected. ECUs such as the main ECU 10, the ECUs 20 to 23, and the like can be used as units to detect the abnormal events. Each ECU detects an abnormal event based on output values such as live data of each sensor and the like (for example, detection of an abnormal voltage of a battery, detection of a breakage, detection of a sensor fault, detection of a shock). When the output value of the sensor satisfies a predetermined abnormality determination condition to determine the presence or absence of the abnormal event, the corresponding ECU determines the presence of the abnormal event and records an abnormal code such as a diagnostic trouble code corresponding to the abnormal event in a nonvolatile memory such as an EEPROM. The recorded abnormal code is read out by a recorded information reading device such as the diagnostic tool 50, thereby a user and a system can know the past abnormal state (for example, an abnormal voltage, a breakage, a sensor fault, and a shock by an accident). The main ECU 10 can obtain information of the abnormal event detected (information of an abnormal code generation) by each ECU. Therefore, when the detection of an abnormal event such as generation of an abnormal code occurs, a vehicle state determined by the vehicle state determination unit 12 is recorded in the memory unit 14. In this manner, a vehicle state when the abnormal event is detected can be recorded in the memory unit 14.

Duration time of the vehicle state from the start of the vehicle state is also recorded and held in the memory unit 14 in addition to the vehicle state when the abnormal event is detected. The duration time of the vehicle state determined by the vehicle state determination unit 12 is measured by the time measuring unit 16 (see FIG. 1) such as a timer. The time measuring unit 16 measures time from when an output value of the sensor satisfies a determination condition to determine a predetermined vehicle state (when the output value exceeds a decision threshold) to when the output value of the sensor satisfies an abnormality determination condition (that is, duration time of the vehicle state to when the abnormal determination condition is satisfied). For example, the time measuring unit 16 measures time from when an output value of the sensor exceeds a determination threshold for determining a predetermined vehicle state until when an abnormal code is generated (that is, duration time of a vehicle state when an abnormal code is generated). Moreover, the time measuring unit 16 may measure time from when an output value of the sensor satisfies a first determination condition to determine a first vehicle state (when the output value exceeds a first threshold) to when the output value satisfies a second determination condition to determine a second vehicle state (when the output value exceeds a second threshold) which is different from the first vehicle state (that is, duration time of the first vehicle state). "An output value of the sensor exceeds a decision threshold" may mean any one of, for example, "the output value of the sensor exceeds the decision threshold a predetermined number of times", "the output value of the sensor exceeds the decision threshold for a predetermined period", "the output value of the sensor becomes higher than the decision threshold", "the output value of the sensor becomes lower than the decision threshold", or a combination of any of these. As a result, a decision threshold can be appropriately set in accordance with a type of the sensor and a kind of a vehicle state.

Figure 11:
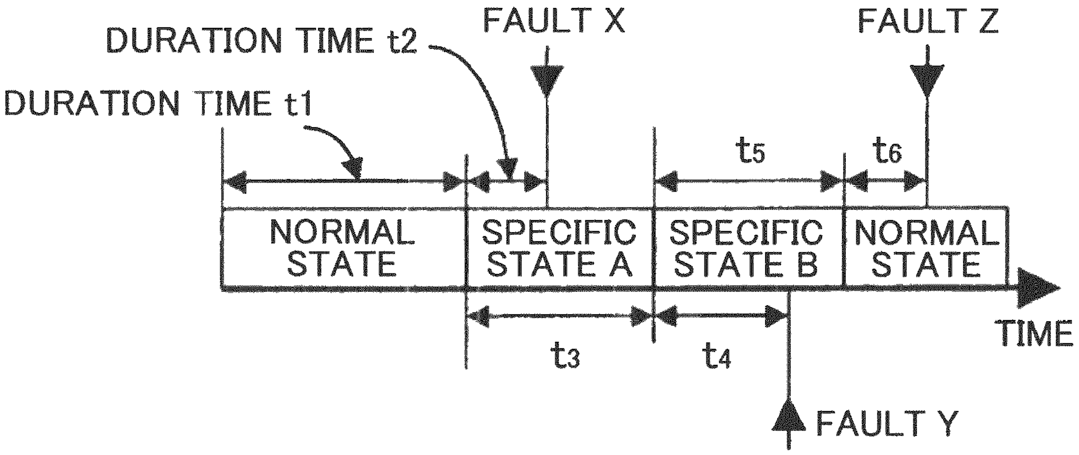
FIG. 11 is a diagram showing vehicle states determined by the vehicle state determination unit 12 and duration time of the vehicle states.

FIG. 11 is a diagram showing vehicle states determined by the vehicle state determination unit 12 and duration times of the vehicle states. FIG. 11 shows that the vehicle state shown as an example in FIG. 2 transitions from a normal state to a specific state A, to a specific state B, and to the normal state as time passes based on the predetermined state determination conditions. The time measuring unit 16 measures time from when an output value of the sensor satisfies a determination condition to be the normal state to when an output value of the sensor satisfies a determination condition to be the specific state A, thereby duration time t1 from the start to the end of the normal state can be measured. Further, the time measuring unit 16 measures time from when the vehicle state transitions from the normal state to the specific state A to when an abnormal code such as a diagnostic trouble code indicating detection of a fault X is generated, thereby duration time t2 of the specific state A, which is from the transition to the specific state A to the detection of the fault X, can be measured. Duration time t3 of the specific state A, duration time t5 of the specific state B, duration time t4 from when the vehicle state transitions to the specific state B to detection of a fault Y, and duration time t6 from a transition to the normal state to detection of a fault Z can be similarly measured.

Therefore, when the detection of an abnormal event such as generation of an abnormal code occurs, the duration time of a vehicle state starts to be recorded in the memory unit 14. In this manner, it is easier to know the duration time of the vehicle state before the abnormal event occurs, compared to the case of recording the time of day in the memory unit 14, triggered by the detection of an abnormal event such as generation of an abnormal code. To be specific, for example, it is possible to easily know the fact that an abnormal event corresponding to an abnormal code such as a diagnostic trouble code has occurred after a "rough road surface state" determined as a vehicle state by the vehicle state determination unit 12 has continued for 10 minutes.

That is, in the case of recording the time of day, it is impossible to know the duration time of a vehicle state before a fault occurs, unless the recorded information (the time of day) is processed when analyzing the fault. When recording the duration time of the vehicle state, on the contrary, it is possible to know the duration time of a vehicle state before the fault occurs without processing the recorded information (time of day) when analyzing the fault. In this manner, reusability of the recorded information can be enhanced.

By recording the duration time of a vehicle state in the memory unit 14 with detection of an abnormal event such as generation of an abnormal code as a trigger, less memory capacity is required in the memory unit 14 compared to the case of recording instantaneous values of an output value of the sensor in the memory unit 14 with detection of an abnormal event such as a generation of an abnormal code as a trigger. To know a time-sequential change of a vehicle state by recording instantaneous values of the output value of the sensor, the output values of the sensor are required to be recorded plural times with a specific time span or by a specific trigger. When recording instantaneous values of the output value of the sensor, vast memory capacity is required to know a primary or secondary state change as shown in FIG. 10. On the other hand, by recording duration time itself of a vehicle state determined by the vehicle state determination unit 12, less memory capacity is required to know the change of the vehicle state.

Figure 12:
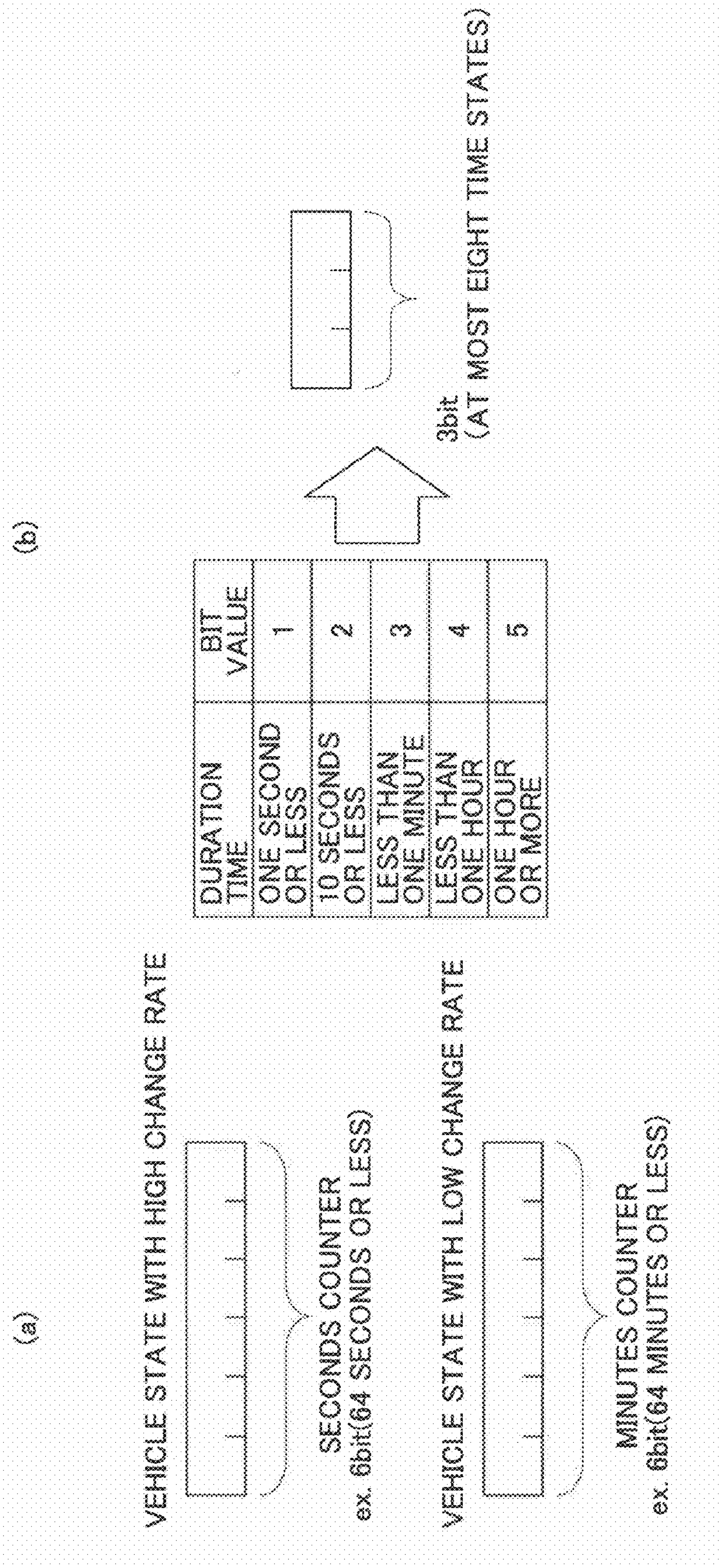
FIGS. 12*a* and 12*b* are diagrams for describing recording formats of the duration time of the vehicle state.

FIGS. 12*a* and 12*b* are diagrams for describing recording formats of the duration time of the vehicle state.

A time unit (count unit) of duration time of a vehicle state determined by the vehicle state determination unit 12 may be set in accordance with a change rate of the vehicle state. That is, a format of a counter to measure duration time of the vehicle is set differently depending on the kind of the vehicle state. As a result, a larger time unit can be set in the case where a change rate of the vehicle state is low compared to the case of the high change rate. Therefore, less memory capacity is required to record the duration time of the vehicle state.

FIG. 12*a* shows the case of changing the minimum time unit of the time counter in accordance with the change rate of the vehicle state. That is, the time width for one bit is changed in accordance with the change rate of the vehicle state. For example, steering angle data detected by the steering sensor have a relatively high change rate compared to the other sensors. Thus, a change rate of a curve state, which is detected by the steering angle data, is rather high compared to the change rates of other vehicle states. Therefore, the minimum time unit of a time counter to measure duration time of the curve state determined by the steering angle data is preferably a second or shorter. Moreover, since ambient temperature data detected by the ambient temperature sensor have a relatively low change rate compared to the other sensors, an ambient temperature state determined by using the ambient temperature data has also a relatively low change rate as compared to the other vehicle states. Therefore, the minimum time unit of a time counter for measuring duration time of the ambient temperature state determined by the ambient temperature data is preferably a minute or longer.

As shown in FIG. 12*b*, duration time of a vehicle state measured by the time measuring unit 16 may be recorded in the memory unit 14 in a time format divided by a predetermined time width. For example, a counter value is set "1" when the duration time measured by the time measuring unit 16 is less than one second, and the counter value is set "1" when the duration time measured by the time measuring unit 16 is one minute or more and less than one hour. As a result, for example, by providing a memory capacity of three bits, the duration time of the vehicle state can be recorded as at most eight time states (time divisions), which leads to a reduction in memory capacity requirements.

Figure 13:
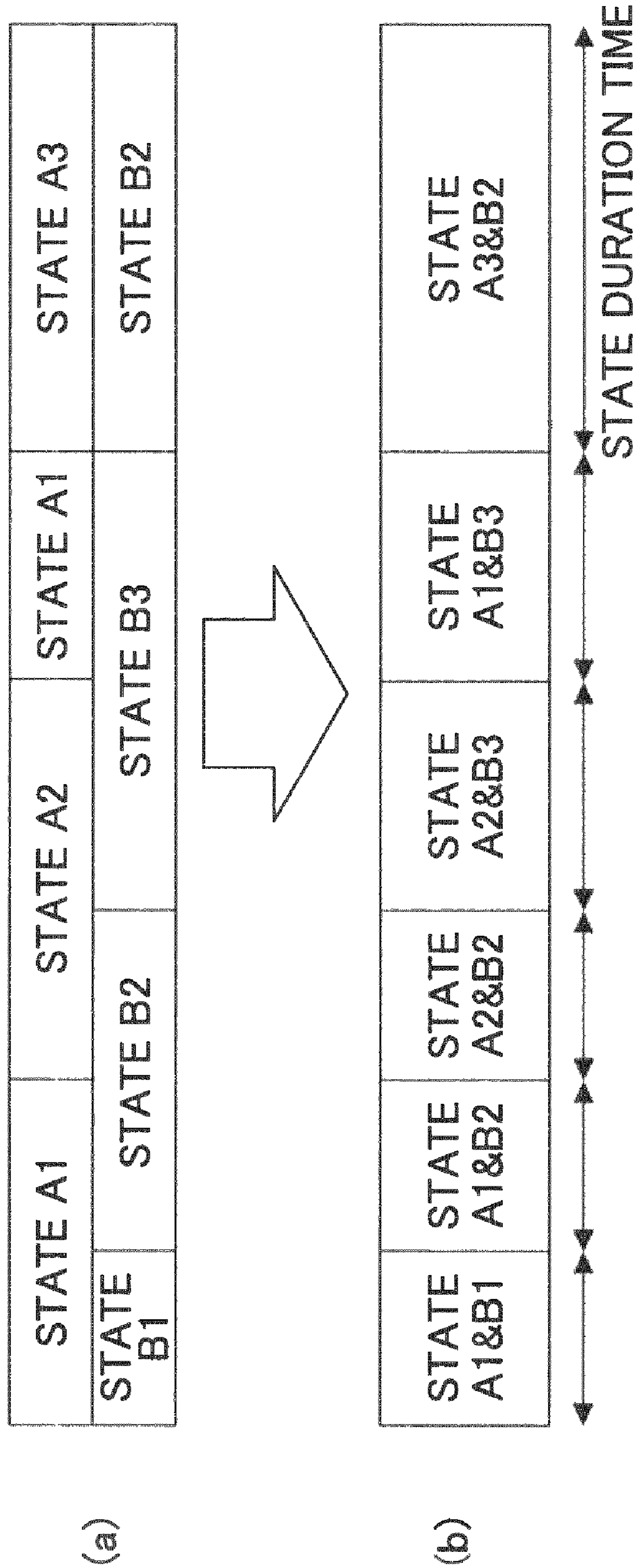
FIG. 13 is a diagram showing a method to record plural vehicle states together.

When there are plural vehicle states to record, some vehicle states may be recorded together. FIG. 13 is a diagram for describing a method to record plural vehicle states together. In FIG. 13, different vehicle states A and B are recorded together. As shown in FIG. 13*a*, a detailed state of the vehicle state A changes from a state A1 to a state A2, to a state A1, and to a state A3 in this order, while a detailed state of the vehicle state B changes from a state B1 to a state B2, to a state B3, and to a state B2 in this order as time passes. As shown in FIG. 13*b*, each state at timings when the detailed states of the vehicle states A and B transition are recorded together in the memory unit 14 in addition to the duration time before the transition timings. Each detailed state of the vehicle states A and B is determined by three states as shown in FIG. 2. Then, a memory capacity of four bits (=2+2) is required, however, the memory capacity can be reduced to half by recording the vehicle states together. It is preferable to record vehicle states having moderate change rates together.

The main ECU 10 shown in FIG. 1 includes the vehicle state determination unit 12, the memory unit 14, and the time measuring unit 16, however, these units may be separately provided in other ECUs as well. For example, these units may be provided in only another ECU besides the main ECU 10, or in both the main ECU 10 and another ECU. A microcomputer having, for example, a central processing unit or the like in the ECU may realize the functions of the vehicle state determination unit 12 and the time measuring unit 16.

Figure 14:
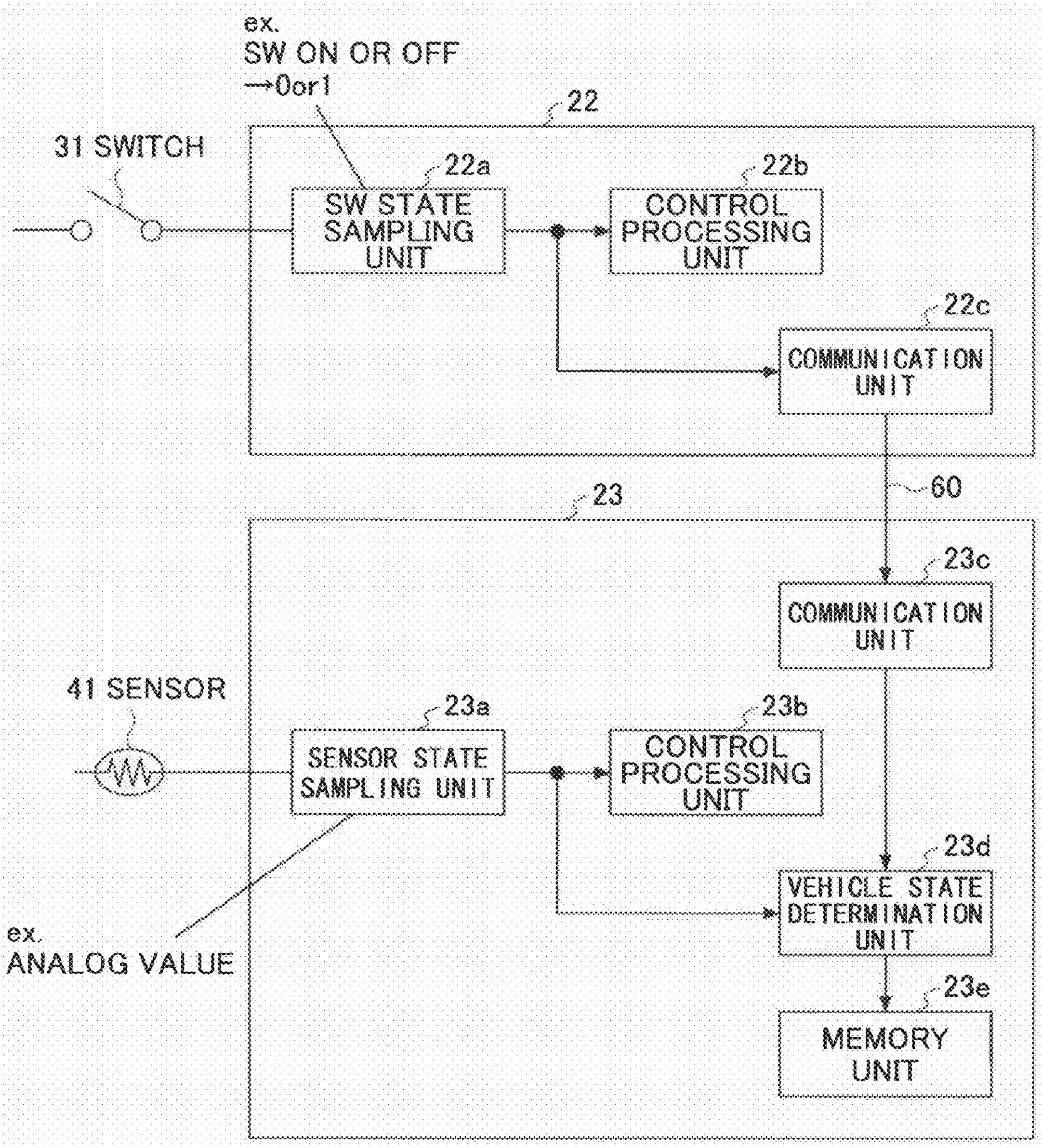
FIG. 14 is a configuration diagram in which a vehicle state determination unit and a memory unit are provided in an ECU 23.

FIG. 14 is a configuration diagram in which a vehicle state determination unit and a memory unit are provided in the ECU 23. In FIG. 14, a microcomputer having, for example, a central processing unit or the like in the ECU may realize functions of a SW state sampling unit 22*a*, a control processing unit 22*b*, a sensor state sampling unit 23*a*, a control processing unit 24*b*, and a vehicle state determination unit 23*d*.

While the control processing unit 22*b* in the ECU 22 performs a predetermined process by using the state of the switch 31 sampled by the SW state sampling unit 22*a*, the communication unit 22*c* of the ECU 22 sends the sampled state of the switch 31 to the ECU 23 through a communication path 60.

A control processing unit 23*b* of the ECU 23 performs a predetermined process by using a state of the sensor 41 sampled by the sensor state sampling unit 23*a*. On the other hand, the vehicle state determination unit 23*d* determines a vehicle state based on the state of the sensor 41, which is sampled by the sensor sampling unit 23*a*, and the state of the switch 31, which is received by a communication unit 23*c* of the ECU 23.

FIGS. 15*a* and 15*b* are diagrams for describing a method to determine a vehicle state from two output values of a sensor and a switch. As shown in FIG. 15*a*, detailed states of the vehicle state are different depending on the combination of the sensor and the switch. The vehicle state determination unit determines a vehicle state based on a map according to FIG. 15*a*. Therefore, output values of the sensor and the switch are in a relationship shown in FIG. 15*b*. For example, the vehicle state is determined to be a normal state when the output value of the switch is 0 and the output value of the sensor is as low as or lower than a decision threshold X1. The vehicle state is determined to be a specific state 1 when the output value of the switch is 0 and the output value of the sensor is equal to or greater than the decision threshold X1 or equal to or lower than a decision threshold X2. The vehicle state is determined to be a specific state 2 when the output value of the switch is 1 and the output value of the sensor is as high as or higher than the decision threshold X2.

In the above description, a vehicle state when an abnormal event is detected and the duration time from when the vehicle state started are recorded and held in the memory unit 14, however, a vehicle state before the output value exceeds the decision threshold, which is determined by the vehicle state determination unit 12, and duration time of the vehicle state may be recorded and held in the memory unit 14 as well. As a result, a causal relationship between "the vehicle state before detection of the abnormal event and its duration time" and "the vehicle state when the abnormal event occurs and its duration time" can be known. In this manner, a cause of the abnormal event can be more easily estimated.

Figures 16, 17:
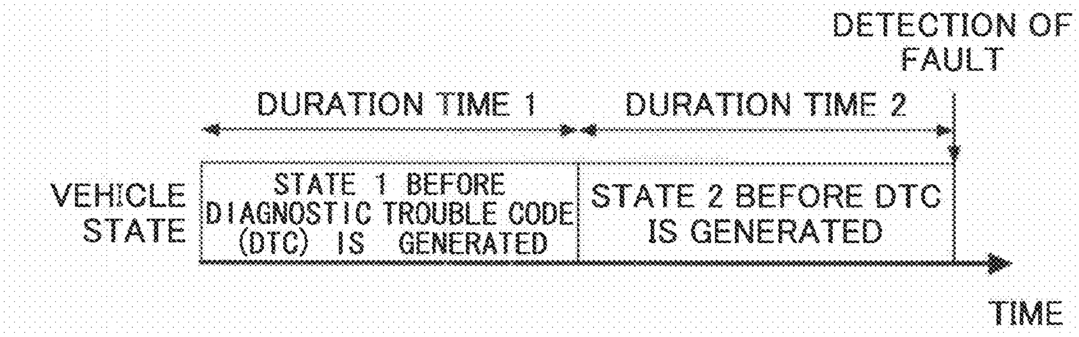
FIG. 16 is a diagram showing a vehicle state when a fault occurs, a vehicle state before the fault occurs, and a duration time of each of the vehicle states.
FIG. 17 is a diagram showing memory areas of each of duration times 1 and 2.

FIG. 16 is a diagram showing a vehicle state when a fault occurs, a vehicle state before the vehicle state, and duration time of each vehicle state. The vehicle state before the vehicle state when the fault occurs is defined as "a state 1 before a diagnostic trouble code (DTC) is generated" and the vehicle state when a fault occurs is defined as "a state 2 before the DTC generation". Duration time of the state 1 before the DTC is generated is defined as "duration time 1" and duration time of the state 2 before DTC generation is defined as a "duration time 2". FIG. 17 shows each recording area of the duration times 1 and 2. For each of the state 1 before the diagnostic trouble code (DTC) generation and the state 2 before the DTC generation, a recording area is provided to record the respective duration time.

Figure 18:
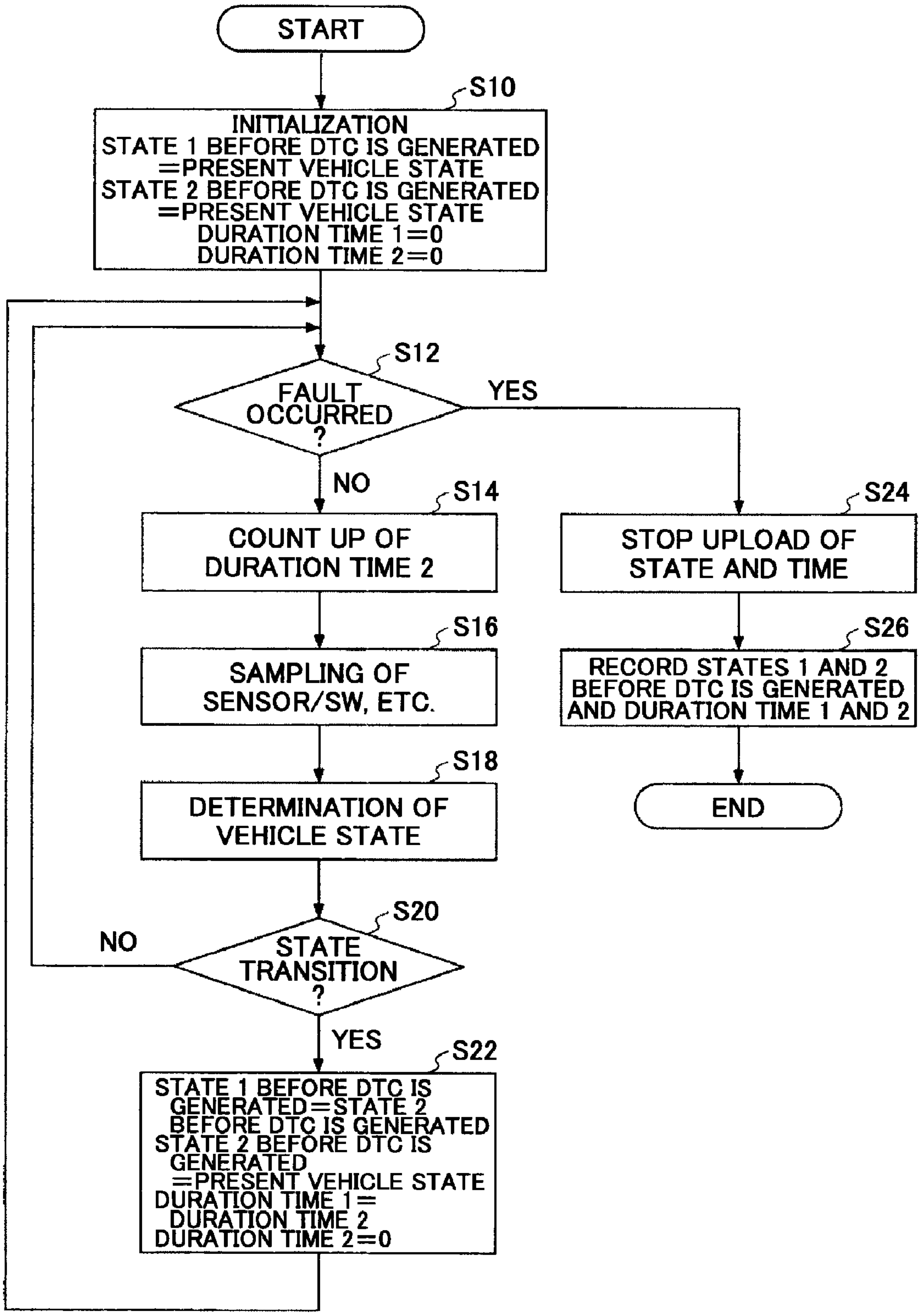
FIG. 18 shows an example of a flowchart to record the vehicle state when a fault occurs, the vehicle state before the fault occurs, and the duration time of each vehicle state in a memory unit 14.

FIG. 18 shows an example of a flowchart of a process to record the vehicle state when a fault occurs, the vehicle state before the vehicle state when a fault occurs, and duration time of each vehicle state in the memory unit 14. In step 10, initialization is performed. In the initialization, the present vehicle state is set in each of the state 1 before the DTC generation and the state 2 before the DTC generation, and 0 is set for each of the duration times 1 and 2.

When a fault is not detected in step 12, the duration time 2 is incremented by a predetermined count width (step 14). Moreover, sampling of the sensor, the switch, and the like are performed (step 16), and then a vehicle state is determined by using the sampling result based on a predetermined state determination condition (step 18). When the vehicle state has not transitioned after the vehicle state is determined in step 18 (NO of step 20), the process flow is repeated from step 12. On the other hand, when the vehicle state is transited after the determination in the step 18 (YES in step 20), a step 22 starts. In the step 22, the vehicle state set as the state 2 before the DTC generation is set as the state 1 before the DTC generation since the vehicle state has transitioned, whereby the present vehicle state (the vehicle state determined in step 18) is set as the state 1 before the DTC generation. Furthermore, the time set as the duration time 2 is set as the duration time 1, and 0 is set as the duration time 2.

When a fault is detected in step 12, on the other hand, a vehicle state determined by the vehicle state determination unit and the duration time measured by the time measuring unit are not uploaded anymore (step 24). Then, the vehicle state set as the state 1 before the DTC generation and the vehicle state set as the state 2 before the DTC generation, and times set as the duration times 1 and 2, which are set when the fault is detected, are recorded in the memory unit (step 26).

In this manner, the vehicle state of when a fault is occurred, the vehicle state before the fault occurs, and duration time of each vehicle state can be recorded in the memory unit 14 according to this process flow.

In the above description, the vehicle state when the abnormal event is detected and the duration time of the vehicle state are recorded and held in the memory unit 14. However, time (hereinafter called "over threshold continuous duration time") from when the output value of the sensor satisfies the first determination condition for determining the first vehicle state (when the output value exceeds the first decision threshold) to when the output value of the sensor satisfies the second determination condition for determining the second vehicle state which is different from the first vehicle state (when the output value exceeds the second determination threshold) may be recorded and held in the memory unit 14. The over threshold continuous duration time corresponds to, for example, the duration time t3 of the specific state A and the duration time t5 of the specific state B in the case of FIG. 11. If the memory unit 14 has space, the duration time t1 of the normal state may be included as well. In this manner, by recording the over threshold continuous duration time, it becomes easier to analyze an abnormal event which is generated when a specific vehicle state that exceeds the threshold is continued. As for an abnormal event which is generated when a horizontal gravity is applied for a long time, for example, a vehicle runs up and down whirling around in a multistory parking lot, but is not generated when the vehicle runs a normal curve, characteristics can be obtained from the over threshold continuous duration time related to a sensor such as the horizontal gravity sensor and the yaw rate sensor. That is, when a certain abnormal code is found recorded in analyzing the fault, it can be easily surmised that the abnormal event corresponding to the abnormal code is likely to be generated when the horizontal gravity is applied for a long time, when the over threshold continuous duration time related to the sensor such as the horizontal gravity sensor and the yaw rate sensor is longer than the normal cases.

The over threshold continuous duration time may be cumulated to be recorded and held in the memory unit 14. That is, a cumulative over threshold continuous duration time (hereinafter called "cumulative over threshold duration time") may be recorded and held in the memory unit 14. In FIG. 11, for example, the cumulative over threshold duration time corresponds to a value in which the duration time t3 of the specific state A and the duration time t5 of the specific state B are added. By checking the cumulative over threshold duration time, characteristics unique to the vehicle can be easily known. This is because the cumulative over threshold duration time easily changes depending on the driving conditions and an environment where the vehicle is used. In this manner, by recording the cumulative over threshold duration time, the past frequency at which the specific vehicle state which exceeds the threshold has occurred can be easily known.

Further, cumulative duration time of vehicle states of when an abnormal event is detected (hereinafter called "cumulative abnormal state time") may be recorded and held in the memory unit 14. In FIG. 11, for example, the cumulative abnormal duration time corresponds to a cumulative value of the duration time t2 of the specific state A when the fault X is detected, a cumulative value of the duration time t4 of the specific state B from when the vehicle state transitioned to the specific state B to when the fault Y is detected, and a cumulative value of the duration time t6 of the normal state from when the vehicle state transitioned to the normal state until the fault Z is detected. Duration times of the vehicle states are preferably cumulated for each abnormal event. In this manner, by recording the cumulative abnormal state time, the length of a period that the vehicle states have continued in the past can be known. For example, by cumulating and recording the duration times of the vehicle states when the fault X is detected every time the fault X is detected, the length of a period that the vehicle state continued in the past when the fault X has been detected can be known.

Moreover, the number of trips in which the output value of the sensor exceeds the decision threshold (hereinafter called "number of over threshold trips") may be recorded and held in the memory unit 14. The trip is a standard indicating a periodicity of vehicle driving. One trip may be set as, for example, a period from when a start switch such as an ignition switch of a vehicle is turned on (off to on) until the start switch is turned on (off to on) again, or a period from when the start switch of the vehicle is turned on until the start switch is turned off. In FIG. 11, for example, the number of over threshold trips corresponds to the number of trips in which a transition from the normal state to the specific state A or B is detected. When the power is shut down, the system is initialized. Therefore, the number of over threshold trips can be one of the standards in analyzing the fault to determine the regularity of the generation of the abnormal event or regularity of the output value exceeding the threshold. In this manner, by recording the number of over threshold trips, the number of past trips in which the output value exceeded the threshold can be known. Note that one trip may be counted when the engine is started or the engine rotational speed becomes as high as or higher than a predetermined value for the first time after the start switch of the vehicle is turned on. Alternatively, one trip may be counted when the vehicle starts running or when the vehicle speed becomes as high as or higher than a predetermined value for the first time after the start switch of the vehicle is turned on.

The number of trips in which an abnormal event is detected (hereinafter called "number of abnormal trips") may be recorded and held in the memory unit 14. In FIG. 11, for example, the number of abnormal trips corresponds to the number of trips in which an abnormal event such as the fault X is detected. Therefore, by recording the number of abnormal trips, the number of past trips in which an abnormal event is detected can be known. The number of abnormal trips may be added independently for each abnormal event. As a result, the number of past trips in which the abnormal event is detected can be known.

Moreover, the number of times that the output value of the sensor or the like has exceeded the decision threshold for determining a vehicle state (hereinafter called "number of over threshold output values") may be recorded and held in the memory unit 14. By recording the number of over threshold output values, the number of past transitions of a detailed state of the vehicle state to another detailed state can be known. For example, the number of past transitions from the normal state to the specific state (for example, a rough road surface state) can be known.

By recording the plural information items such as the over threshold continuous duration time, the cumulative over threshold duration time, the cumulative abnormal state time, the number of over threshold trips, the number of abnormal trips, and the number of over threshold output values, analysis can be performed from various directions, whereby a fault can be more easily analyzed. By recording the number of over threshold trips and the cumulative over threshold duration time, the analysis can be made in view of the regularity based on the recorded number of over threshold trips and in view of the information unique to the vehicle based on the recorded cumulative over threshold duration time. Thus, a fault can be analyzed more easily at a later time. Moreover, by recording the number of over threshold trips, the cumulative over threshold duration time, and the number of over threshold output values, an average length of time that the output value exceeded the threshold in one trip can be known. As a result, a frequency at which the output value exceeds the threshold (for example, "the output value sometimes exceeds the threshold for a long time", "the output value frequently exceeds the threshold for a short time", and the like) can be easily estimated, which further makes it easier to estimate the cause of the abnormality. Furthermore, in the case where the regularity with which the output value exceeds the threshold can be known based on the recorded information such as the number of over threshold trips by which the regularity can be determined, or based on the recorded information itself, it can be analyzed whether the output value exceeds the threshold in a long term or a short term by referring to the recorded cumulative over threshold duration time.

FIG. 19 is a chart showing examples of recorded information in the memory unit 14. In FIG. 19, recorded information for three trips is shown. FIG. 19 shows that information to be recorded in the memory unit 14 is recorded every predetermined time (for example, 20 minutes). When the predetermined time is 20 minutes, trip 1 corresponds to 100 minutes and trip 2 corresponds to 60 minutes. A vehicle state is recorded in every predetermined period which is divided by the predetermined time. When the output value does not exceed the decision threshold in the predetermined period, a normal state is recorded as the vehicle state of the predetermined period. When the output value exceeds the threshold value and a vehicle state transitions to a specific state other than the normal state in the predetermined period, the specific state is recorded as the vehicle state of the predetermined period (for example, periods 3 and 4 in trip 1 and period 8 in trip 2).

Moreover, presence or absence of the output value exceeding the threshold in the predetermined period may be recorded. In FIG. 19, for example, "presence information" indicating that the output value which is related to the specific state A has exceeded the threshold is recorded in the period 3 of trip 1. Further, the over threshold continuous duration time in the predetermined period may be recorded as well. In the case of FIG. 19, one time unit (for example, when a unit of time is defined as five minutes, one time unit corresponds to five minutes) is recorded as the duration time of the specific state A, as the over threshold continuous duration time in period 3 of trip 1. In the over threshold continuous duration time of period 4 of trip 1, two time units (for example, 10 minutes with the same definition) are recorded as duration time of the specific state A. Further, the cumulative over threshold continuous duration time may be recorded. In FIG. 19, a cumulative value of the over threshold continuous duration time is recorded as the cumulative over threshold duration time every time the output value of a sensor related to the specific state A exceeds the threshold value. Further, the number of over threshold trips may be recorded. In FIG. 19, 1 is recorded as the number of over threshold trips every time the output value related to the specific state A exceeds the threshold for the first time in one trip. Further, the number of over threshold output values in the predetermined period may be recorded. In FIG. 19, the number of times that the output value related to the specific state A exceeds the threshold in the predetermined period is recorded as the number of over threshold output values in each predetermined period.

The information items recorded in the memory unit 14 as shown in FIG. 19 are read out by a recorded information reading device such as the diagnostic tool 50 or a computer. Based on the read information, a user can analyze an operation and a fault of the vehicle. In FIG. 19, information about a diagnostic trouble code X, which indicates generation of an abnormality X, is recorded in period 2 of trip 3.

The recorded information shown in FIG. 19 is recorded every certain time period. Based on the recorded information, a user can know characteristics with regularity, which are about a running state such as a movement state and an operating state and a running environment. For example, a user can know that the specific state A has occurred continuously in two trips. In this manner, by recording the plural types of information items such as the over threshold continuous duration time, the cumulative over threshold duration time, the number of over threshold trips, and the number of over threshold output values as shown in FIG. 19, characteristics with regularity, which are about a running state such as a movement state and an operating state and a running environment, and which may be related to the generation of the abnormality X can be all detected.

According to the embodiment, a vehicle state is determined based on a relationship between an output value of a sensor and a predetermined state determination condition for determining the vehicle state. The output value of the sensor, which variously changes depending on the condition of the vehicle, is patterned into a frame of vehicle states that are set in advance. In this manner, information which is reusable to easily estimate a cause of an abnormality at a later time can be formed. By setting the vehicle states determined based on the output values of the sensor into a frame such as the running state including the movement state, the operating state, and the like, and the running environment, by which the situation of the vehicle can be easily known, the cause of an abnormality such as a fault can be easily estimated.

When a cause of an abnormal event corresponding to an abnormal code recorded in the vehicle is to be diagnosed, it is often difficult to estimate the cause of the abnormal event by only the abnormal code. According to the embodiment, a vehicle state when the abnormal event is detected and duration time from when the vehicle state transitioned to a specific state until the abnormal event is detected are recorded. Based on the recorded information, the vehicle state of that time can be easily known and reproduced. At the same time, the length of time from the transition to the specific vehicle state to the detection of the abnormal event can be easily known and reproduced based on the recorded duration time. As a result, the abnormal event can be further analyzed to determine its cause.

That is, with the detection of the abnormal event such as a fault or a traffic accident of the vehicle as a trigger, a vehicle state determined by the output value of the sensor and duration time of the vehicle state are recorded as auxiliary information other than the abnormal code such as the diagnostic trouble code. As a result, more information such as a vehicle state when the abnormal event is detected can be recorded in less memory space than the case of recording the output values of the sensor as they are. Therefore, a cause of the abnormal event can be easily estimated.

Although the invention has been described with respect to a specific embodiment for a complete and clear disclosure, the present invention is not limited to the embodiment, and variations and modifications may be made without departing from the scope of the present invention.

For example, by recording a vehicle state determined by the vehicle state determination unit 12 before the output value exceeds the decision threshold and duration time of that vehicle state in the memory unit 14, a causal relationship becomes clear between "the vehicle state before the abnormal event is detected and the duration time of that vehicle state" and "the vehicle state when the abnormal event is detected and the duration time of that vehicle state", making it easier to estimate a cause of the abnormal event. Alternatively, by also recording and holding "a vehicle state after the abnormal event is detected and the duration time of that vehicle state" in the memory unit 14, a causal relationship between "the vehicle state after the abnormal event is detected and the duration time of that vehicle state" and "the vehicle state when the abnormal event is detected and the duration time of that vehicle state" becomes clear, thereby the cause of the abnormal event can be more easily estimated.

The present application is based on Japanese Priority Application No. 2007-096922, filed on Apr. 2, 2007, the entire contents of which are hereby incorporated by reference.

The invention claimed is:

1. A vehicle information recording system comprising:

an abnormality detecting unit to detect an abnormal event generated on a vehicle;

a vehicle state determination unit that, prior to generation of the abnormal event, determines a vehicle state, which includes at least one of a running state and a running environment of the vehicle, the vehicle state being determined based on an output value and a threshold of a sensor provided to operate in various parts of the vehicle; and a memory unit that records the vehicle state existing when the abnormal event is detected, and records a duration time of the vehicle state, the duration time starting when the output value exceeds the threshold and ending when the abnormal event is detected.

2. The vehicle information recording system as claimed in claim 1, wherein the vehicle state before the output value exceeds the threshold, which vehicle state is determined by the vehicle state determination unit, and a duration time of the vehicle state before the output value exceeds the threshold are also recorded.

3. The vehicle information recording system as claimed in claim 1, wherein a cumulative duration time of the vehicle state during which the output value exceeds the threshold is recorded.

4. The vehicle information recording system as claimed in claim 1, wherein a number of times that the output value exceeds the threshold is recorded.

5. The vehicle information recording system as claimed in claim 4, wherein a number of trips in which the output value exceeds the threshold is recorded.

6. The vehicle information recording system as claimed in claim 1, wherein the threshold includes a plurality of thresholds, and wherein the threshold is set depending on the vehicle states determined by the vehicle state determination unit.

7. The vehicle information recording system as claimed in claim 1, wherein the threshold is set in accordance with an environment where the vehicle is used.

8. The vehicle information recording system as claimed in claim 1, wherein the vehicle state determined by the vehicle information recording system is at least one of a state in which the output value of the sensor exceeds the threshold a predetermined number of times, a state in which the output value of the sensor exceeds the threshold for a predetermined period, a state in which the output value of the sensor becomes higher than the threshold, and a state in which the output value of the sensor becomes lower than the threshold.

9. A vehicle information recording system comprising:

an abnormality detecting unit that detects an abnormal event generated on a vehicle;

a vehicle state determination unit that, prior to generation of the abnormal event, determines a vehicle state, which includes at least one of a running state and a running environment of the vehicle, the vehicle state being determined based on an output value and a threshold of a sensor provided to operate in various parts of the vehicle; and a memory unit that records the vehicle state existing when the abnormal event is detected, and records a duration time of the vehicle state, the duration time starting when the output value exceeds the threshold and ending when the abnormal event is detected, wherein a time unit of the duration time is set in accordance with a change rate of the vehicle state which is determined by the vehicle state determination unit.

10. The vehicle information recording system as claimed in claim 9, wherein the vehicle state before the output value exceeds the threshold, which is determined by the vehicle state determination unit, and a duration time of the vehicle state before the output value exceeds the threshold are also recorded.

11. The vehicle information recording system as claimed in claim 9, wherein a cumulative duration time of the vehicle state during which the output value exceeds the threshold is recorded.

12. A vehicle information recording system comprising:

an abnormality detecting unit that detects an abnormal event generated on a vehicle;

a vehicle state determination unit that, prior to generation of the abnormal event, determines a vehicle state, which includes at least one of a running state and a running environment of the vehicle, the vehicle state being determined based on an output value and a threshold of a sensor provided to operate in various parts of the vehicle; and a memory unit that records the vehicle state existing when the abnormal event is detected, and records a duration time of the vehicle state, the duration time starting when the output value exceeds the threshold and ending when the abnormal event is detected, wherein the vehicle state when the abnormal event is detected and the duration time thereof are recorded in the memory unit based on generation of a diagnostic trouble code corresponding to the abnormal event.

13. The vehicle information recording system as claimed in claim 12, wherein the abnormality detecting unit detects a shock against the vehicle.

14. The vehicle information recording system as claimed in claim 12, wherein the vehicle state before the output value exceeds the threshold, which vehicle state is determined by the vehicle state determination unit, and a duration time of the vehicle state before the output value exceeds the threshold are also recorded.

15. The vehicle information recording system as claimed in claim 12, wherein a cumulative duration time of the vehicle state during which the output value exceeds the threshold is recorded.

16. The vehicle information recording system as claimed in claim 1, wherein live output data of the sensor, including the output value, is processed by the vehicle state determination unit so as to determine a particular vehicle state to which the live output data correlates, the live output data not being recorded to minimize a memory capacity required to record the vehicle state.

* * * * *